United States Patent [19]
Graham et al.

[11] Patent Number: 5,893,202
[45] Date of Patent: Apr. 13, 1999

[54] TOOL AND METHOD FOR INSTALLING THE INNER OIL SEAL IN THE HUB OF A WHEEL ASSEMBLY

[75] Inventors: Charles R. Graham, Long Beach; Rodney R. Phelps, Gulfport, both of Miss.

[73] Assignee: Chiquita Brands, Inc., Cincinnati, Ohio

[21] Appl. No.: 08/933,799

[22] Filed: Sep. 19, 1997

[51] Int. Cl.[6] ............................... B23P 19/02; B23P 6/00
[52] U.S. Cl. ............................... 29/402.02; 29/402.08; 29/235; 29/258; 29/263; 29/266
[58] Field of Search ..................... 29/238, 402.02, 29/402.08, 898.07, 270, 235, 258, 263, 266

[56] References Cited

U.S. PATENT DOCUMENTS

| | | | |
|---|---|---|---|
| 2,964,841 | 12/1960 | Farris | 29/266 |
| 4,709,459 | 12/1987 | Klann | 29/263 |
| 5,709,018 | 1/1998 | Dugan | 29/263 |
| 5,757,084 | 5/1998 | Wagner | 29/898.07 |

Primary Examiner—P. W. Echols
Attorney, Agent, or Firm—Frost & Jacobs LLP

[57] ABSTRACT

A tool and method by which an inner oil seal may be installed in the hub of a wheel assembly which is in a normal upright position. The tool comprises a shaft with a tool mounting plate affixable to the outer end of a hub with the tool shaft extending axially therethrough and terminating in a threaded end. A seal locator and pusher is slidably mountable on said tool shaft from the threaded end thereof. The locator and pusher has a portion facing the tool mounting plate on which the inner seal may be slidably mounted. The opposite face of the locator and pusher is provided with a thrust bearing and thrust washer. The tool includes a nut engageable on the threaded tool shaft end. The wheel assembly is removed form its axle and is maintained in an upright position. The seal mounting tool is bolted to the hub. The inner oil seal is mounted on the locator and pusher which is mounted on the tool shaft from its threaded end. The nut is engaged on the tool shaft threaded end and tightened to cause the locator and pusher to properly and evenly seat the seal in the hub. The tool is thereafter removed from the hub and the wheel assembly is remounted on its axle.

17 Claims, 6 Drawing Sheets

TOOL AND METHOD FOR INSTALLING THE INNER OIL SEAL IN THE HUB OF A WHEEL ASSEMBLY

TECHNICAL FIELD

The invention relates to a tool and a method for installing the inner oil seal in the hub of a wheel assembly, and more particularly to such a tool and method which will correctly and uniformly install the inner oil seal while the wheel assembly is in a normal, upright, vertical position.

BACKGROUND ART

The installation of the inner oil seal in the hub of a wheel assembly has always been a physically taxing operation. This is particularly true in the case of a dual tire and wheel assembly because the combination of a hub, a pair of wheels and a pair of tires can weigh in excess of 500 pounds. For this reason the invention will be described in its application to a dual tire and wheel assembly, it being understood that the invention is equally applicable to a single tire and wheel assembly.

Heretofore, according to one prior art practice, a worker would remove a dual tire and wheel assembly from its axle (the outer bearing having been removed) and lower it to the floor using a lifting dolly. Once on the floor, the worker would remove the worn seal and the inner bearing, and would thereafter physically shove the dual tire and wheel assembly over, so that it lay on the side of the outermost tire with the rearward end of the hub facing upwardly. The inner bearing would then be manually relocated in the hub. The worker would then locate a new seal and the inner bearing on a mounting tool comprising a shaft having a first free end and a second end to which a member, comprising a holder, was welded. The new inner seal was mounted on the seal holder portion of the tool and the holder portion of the tool was inserted in the inner end of the hub. The worker, holding the tool shaft, would then apply a series of blows to the first free end of the tool shaft with a hammer, manually maintaining the tool shaft as nearly as possible in an axial position with respect to the hub. Once the inner oil seal was seated in the inner end of the hub, the tool would be removed and the dual tire and wheel assembly was ready to be reinstalled on the vehicle axle.

At this point, the worker, with the help of an elongated lever tool, would physically lift the dual tire and wheel assembly to an upright position. The wheel and tire assembly was then reinstalled on the axle with the help of the lifting dolly. The outer bearing was inserted in the hub and the dual wheel and tire assembly was tightened on the axle by a large nut or a pair of axle nuts and an intermediate thrust washer, as is known in the art. Thereafter, the hub cap was bolted or otherwise appropriately affixed to the hub.

Another prior art practice was similar to the one just described, using a similar tool. In this instance, however, the tire assembly was not shoved to a horizontal position, but rather was allowed to remain upright. The worker, assuming a bent-over position, would insert both the inner bearing and new inner seal by means of hammer blows to the free end of the tool shaft again trying to maintain the tool shaft aligned with the hub axis.

The present invention provides a tool and a method by which the inner oil seal may be installed in the hub of a dual tire and wheel assembly without having to lay the dual tire and wheel assembly over onto the outer side of the outboard tire, or without having to apply blows from a bent-over position while attempting to keep the tool properly aligned.

As a result, no manual shoving or lifting of the heavy dual tire and wheel assembly is required. Alternatively, no awkward position need be assumed by the worker while attempting to keep the installation tool properly aligned. In addition, the tool of the present invention assures that the inner oil seal is pressed in place accurately and evenly throughout its circumference.

DISCLOSURE OF THE INVENTION

According to the invention, there is provided a tool and a method by which the inner oil seal may be installed in the hub of a dual tire and wheel assembly (or a single tire and wheel assembly) while it remains in a normal, upright position. The tool comprises an elongated shaft having first and second ends. A tool mounting plate is welded to the shaft near its first end. The tool mounting plate is affixable to the outer end of the hub with the tool shaft extending axially through the hub. The second end of the tool shaft, extending beyond the inner end of the hub, is threaded.

A seal locator and pusher is slidably mountable on the tool shaft from the threaded second end thereof. The locator and pusher has a portion, facing the tool mounting plate, on which the inner seal and the inner bearing may be mounted. The opposite face of the locator and pusher is provided with a thrust bearing and a thrust washer. The tool is completed by the provision of a nut engageable on the threaded second end of the tool shaft.

The dual or single tire and wheel assembly is removed from its axle and is maintained in an upright position. The seal to be replaced and the inner bearing are removed from the hub. The seal mounting tool is bolted to the hub outer end with the tool shaft extending axially through the hub. The inner oil seal and the inner bearing are mounted on the locator and pusher which, in turn, is mounted on the tool shaft from the second threaded end thereof. The nut is engaged on the tool shaft threaded end and tightened to cause the locator and pusher to properly and evenly seat the inner seal and inner bearing in the hub. The tool is thereafter removed from the hub and the wheel assembly is remounted on the axle.

DETAILED DESCRIPTION OF THE INVENTION

Figure 1:
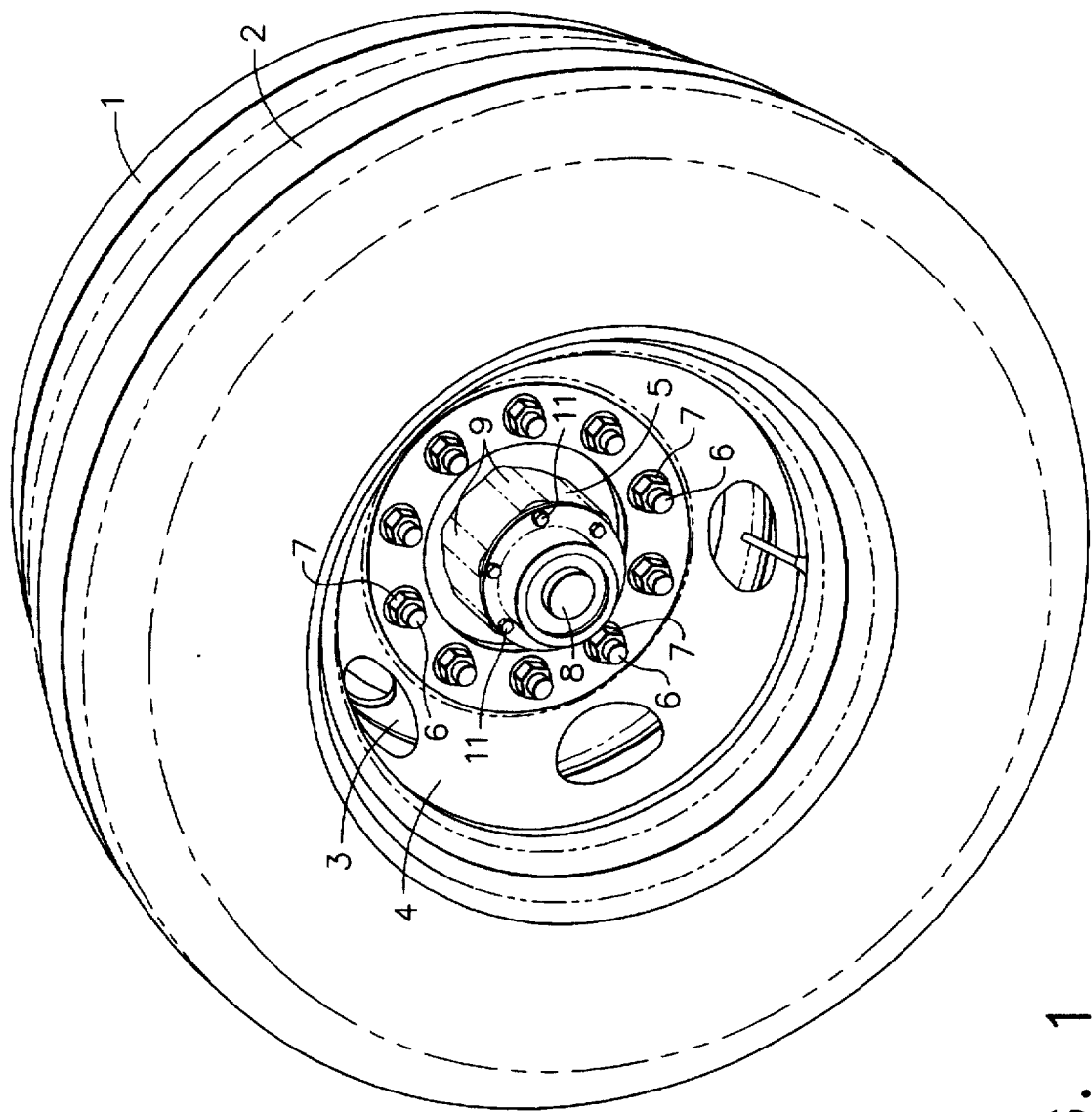
FIG. 1 is a perspective view illustrating an exemplary dual tire and wheel assembly of the type to which the present invention is directed.

Reference is first made to FIG. 1 which illustrates an exemplary dual tire and wheel assembly to which the teachings of the present invention may be applied. The assembly comprises two tires 1 and 2 mounted on two wheels 3 and 4. Wheel 3 is visible through the openings in wheel 4. The wheels 3 and 4 are mounted on a hub 5 by means of a plurality of bolts 6 and nuts 7. Studs may also be used for this purpose.

As is well known in the art, the hub is provided with an inner seal and inner and outer bearings (not shown in FIG. 1). The hub is affixed to the axle (not shown) by a large nut or a pair of nuts and an intermediate lock washer (not shown), as is well known in the art. The large nut or the nuts and lock washer are covered in FIG. 1 by the hub cap 8.

It will be noted in FIG. 1 that the hub 5 has evenly spaced about its periphery a series of longitudinal ribs 9. At the position of each of these ribs, the hub is provided with a longitudinal threaded bore 10 (see FIG. 4). The threaded bores 10 are adapted to receive bolts 11 by which the hub cap 8 is mounted on the outer end of the hub, again as is well known in the art.

Figure 2:
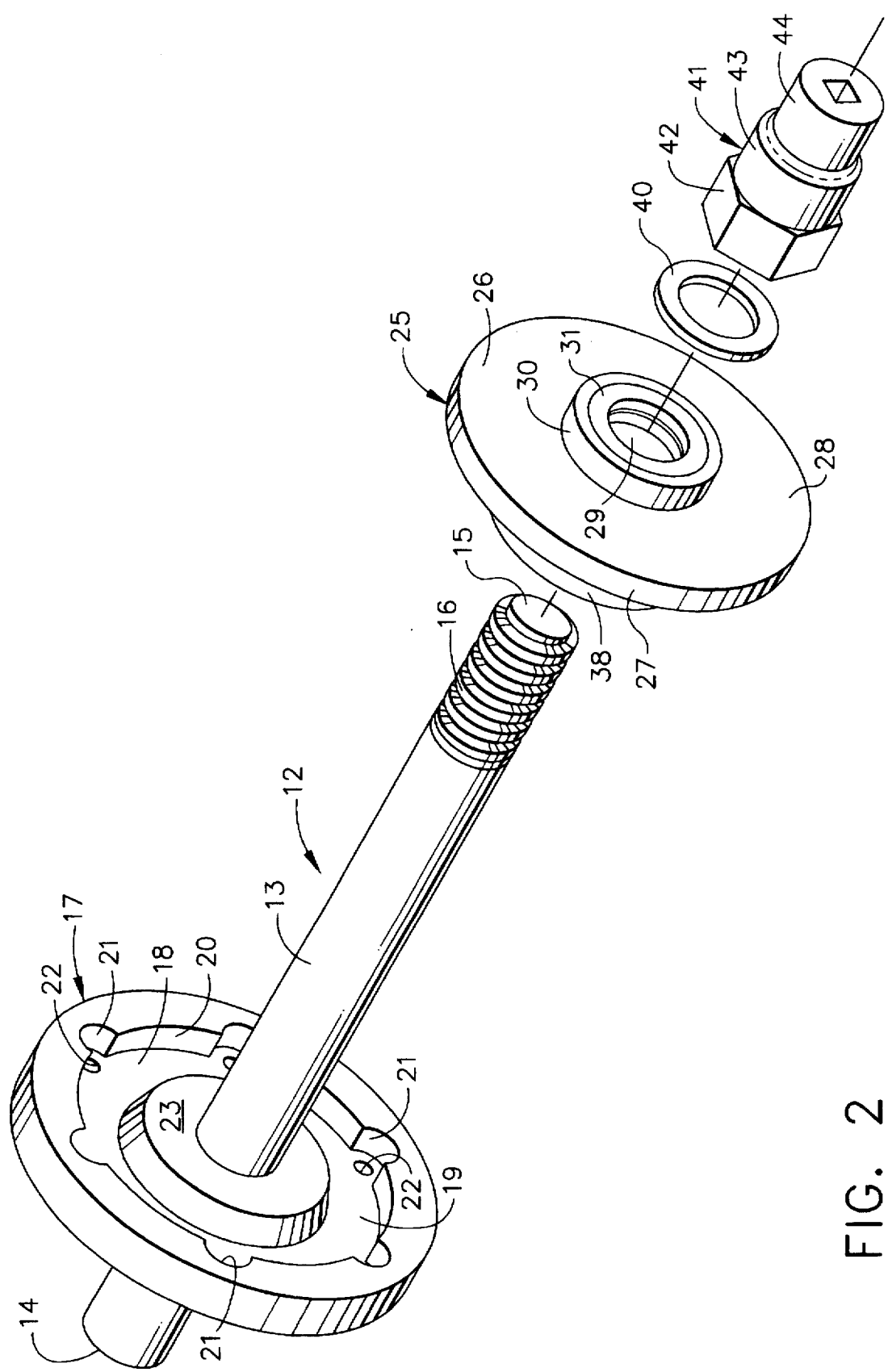
FIG. 2 is an exploded perspective view of the tool of the present invention.

Reference is now made to FIG. 2 wherein the tool of the present invention is illustrated and is generally indicated at 12. The tool 12 comprises an elongated shaft 13 having a first end 14 and a second end 15, the shaft being threaded at the second end 15. The threads are indicated at 16. Spaced axially from the first shaft end 14 there is a tool mounting plate, generally indicated at 17. The mounting plate is circular and has an annular depression 18 formed therein. The depression 18 has a bottom surface 19. The depression 18 has an outer wall 20 of a diameter to just nicely receive the outer end of hub 5. The outer wall 20 is interrupted by evenly spaced notches 21 adapted to receive the ribs 9 of the hub (see FIG. 1). At the position of each notch 21 there is a perforation 22 through the mounting plate. The purpose of perforations 22 will be apparent hereinafter. Centrally of the depression 18, mounting plate 17 has a central hub portion 23. The hub portion 23 has a central bore through which the shaft 13 extends. Mounting plate 17 is fixed to shaft 13 by welding or the like.

In the embodiment shown, the mounting plate 17 is illustrated as a one-piece, integral, machined member. It would be within the scope of the invention to make the mounting plate 17 in two or three parts. For example, that portion of the mounting plate which has the circular wall 20 and notches 21 could constitute a separate ring welded to a circular base providing the depression bottom 19. In a similar fashion, the central hub 23 could be a separate part welded to the member providing the depression bottom 19.

Figure 3:
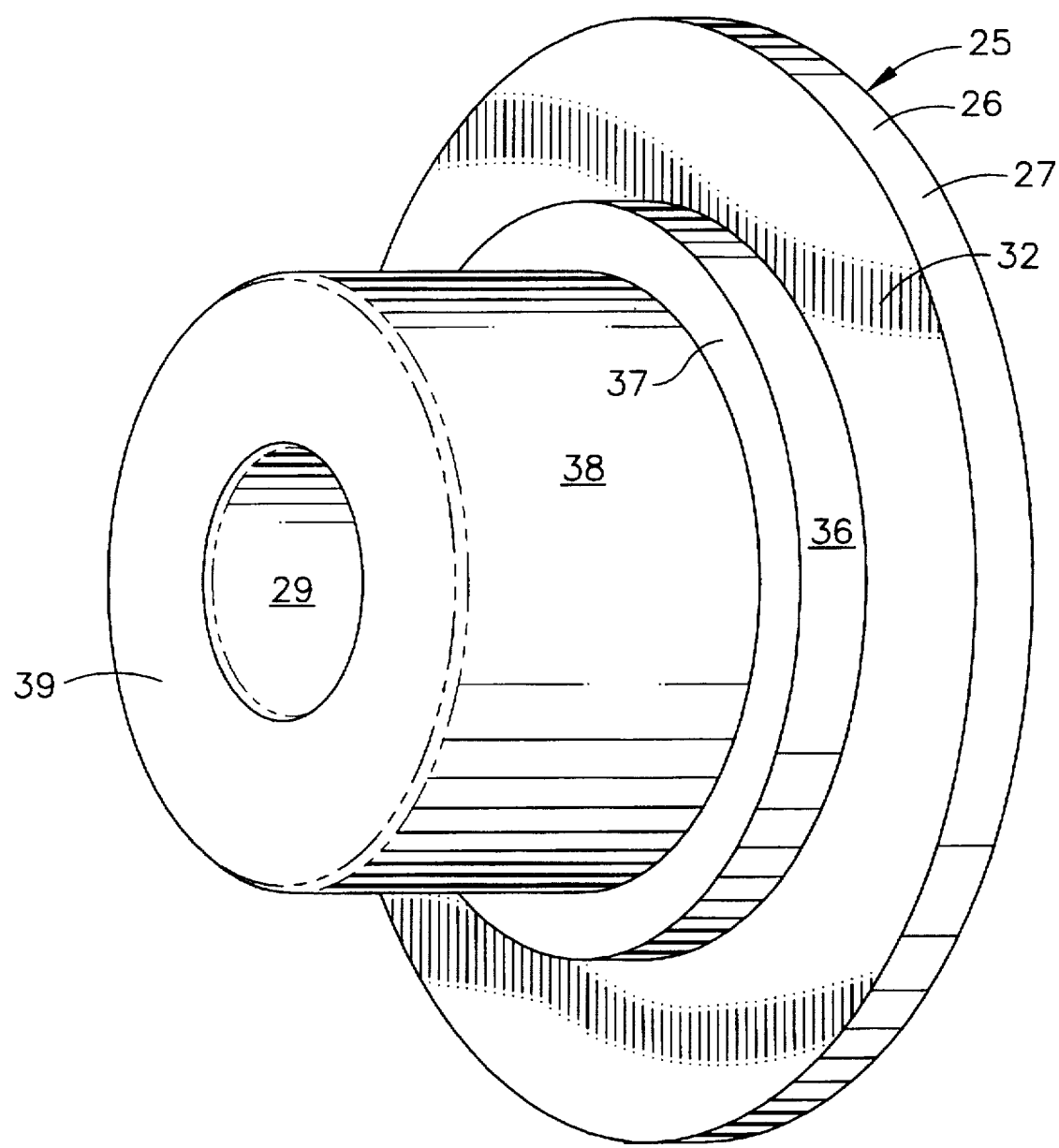
FIG. 3 is a perspective view of the locator and pusher of the tool of the present invention, illustrating the face on which the seal is mounted.

The tool 12 also comprises a locator and pusher, generally indicated at 25. As is shown in FIG. 2, the locator and pusher 25 constitutes a circular plate 26 with a peripheral edge 27. The plate 26 has an inner planar surface 28 with a central bore 29 through which the shaft 13 may pass with a sliding fit. The inner surface 28 has an annular wall 30 surrounding a thrust bearing 31. The outer face of the locator and pusher 25 (shown in FIG. 3) comprises a planar annular surface 32 surrounding an annular wall 36. The annular wall 36 terminates in an annular shoulder 37 which surrounds a cylindrical portion 38. The portion 38 terminates in a planar outer face 39 through which the bore 29 extends.

Figure 6:
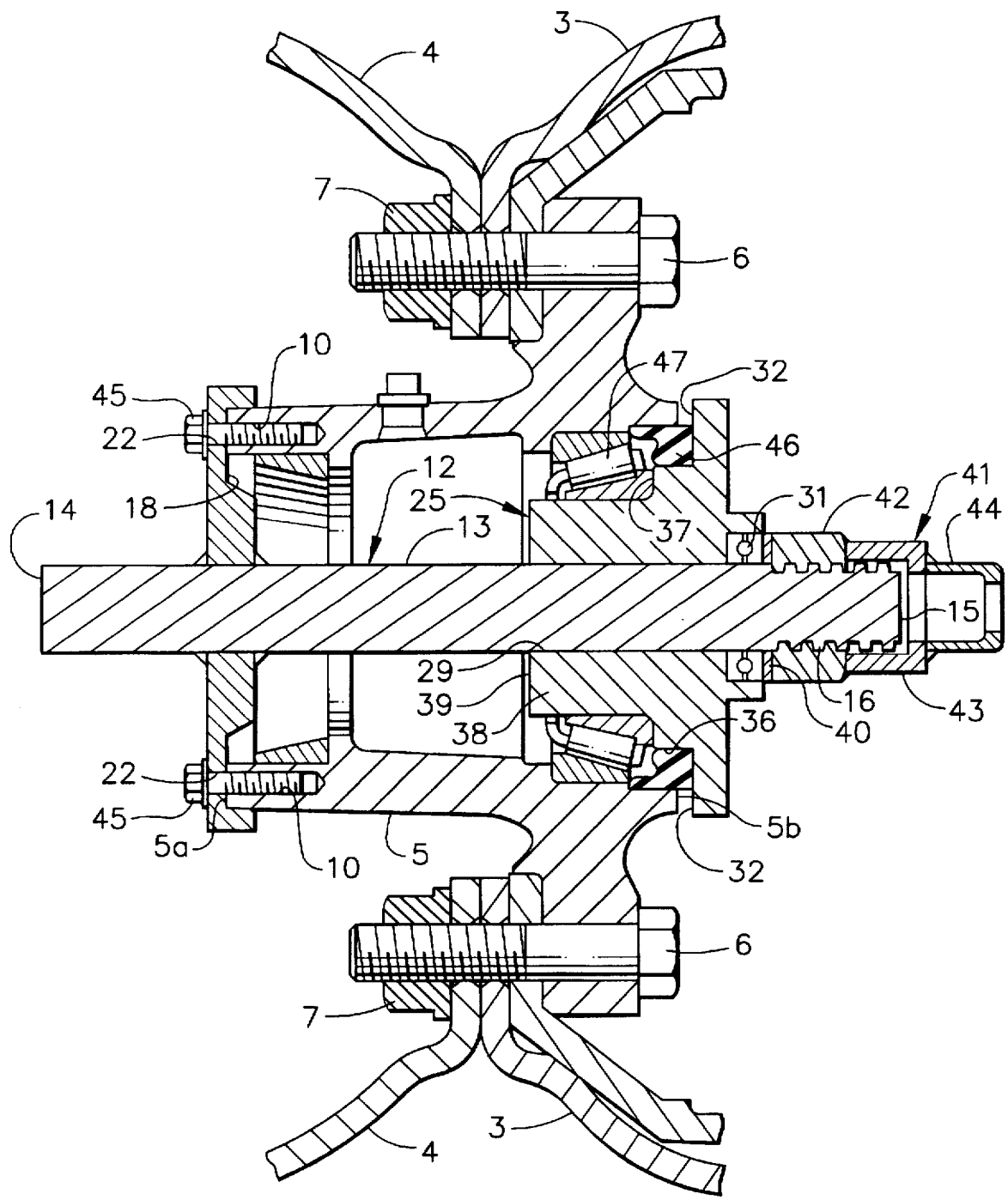
FIG. 6 is a fragmentary cross-sectional view, similar to FIG. 5, and illustrating the inner seal mounted in place by the locator and pusher of the tool of the present invention.

Returning to FIG. 2, it will be noted that the tool 12 is provided with a thrust washer 40 and a nut assembly 41. Nut assembly 41 comprises a threaded nut 42 adapted to engage the threads 16 of tool shaft 13. Welded to nut 42 there is a section of cylindrical pipe 43 adapted to accommodate a portion of the shaft 15 and its threads 16, as shown in FIG. 6. Finally, a heavy duty socket 44 is welded to the pipe section 43 for engagement by a torque wrench.

Figure 4:
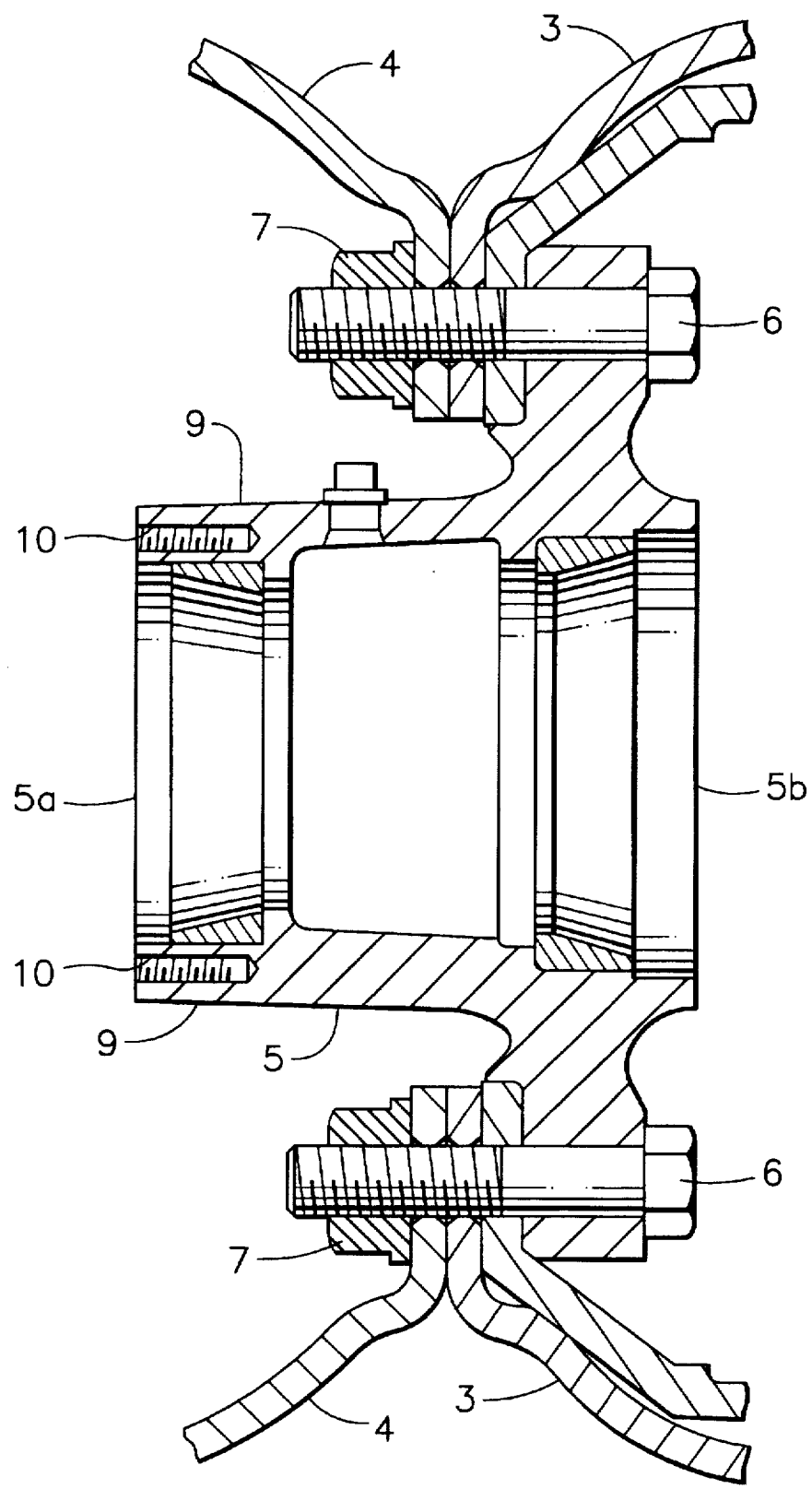
FIG. 4 is a fragmentary axial cross-sectional view of the hub of a dual tire and wheel assembly ready for mounting of the inner seal thereof.

The tool having been described in detail, its method of use may now be set forth. In order to replace an inner oil seal, the workman must first remove the hub cap 8 and the axle nut or nuts and lock washer (not shown). The outer bearing is removed. This enables the dual tire and wheel assembly to be removed from its axle and lowered to the floor or other appropriate surface by means of a lifting dolly or the like. Throughout the remainder of the seal replacement operation, the wheel assembly remains on the floor in a normal, upright position. The worker removes the inner seal and the inner bearing from the hub so that the hub is in the condition illustrated in FIG. 4. For purposes of clarity, the wheels 3 and 4 of the assembly are fragmentarily shown, and the tires 1 and 2 are not shown. It will be understood that neither the tires nor the wheels are removed from the hub for purposes of the inner oil seal replacement operation. FIG. 4 shows the outer end of the hub at 5a and the inner end of the hub at 5b.

Figure 5:
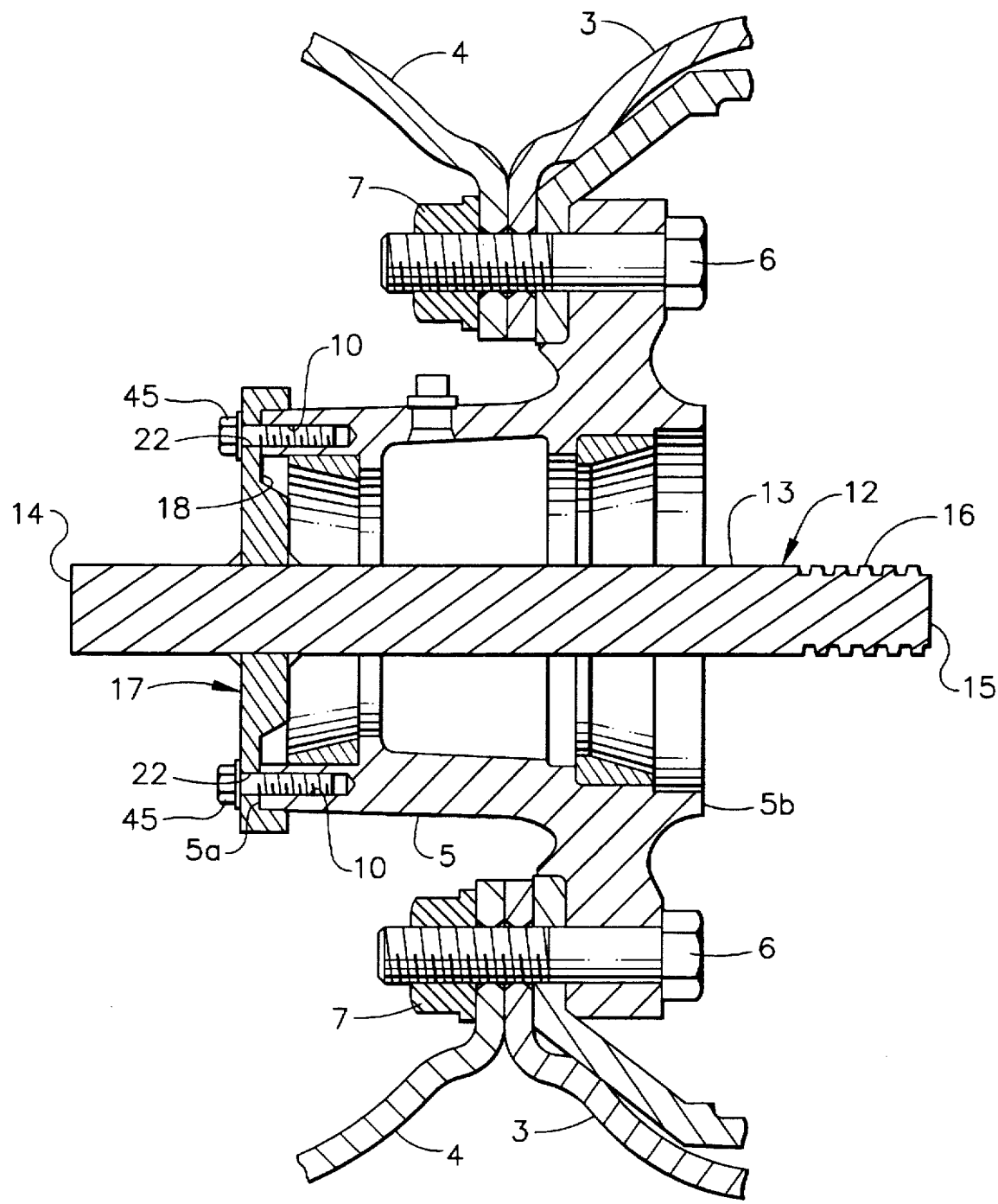
FIG. 5 is a fragmentary cross-sectional view similar to FIG. 4 illustrating the tool shaft and mounting plate affixed to the outer end of the hub.

The next step in the inner oil seal installation operation is illustrated in FIG. 5. The worker inserts the shaft 13 of the tool 12 axially through the hub, causing the outer end 5a of hub 5 to enter the annular depression 18 formed in mounting plate 17. The ribs 9 of hub 5 align with the notches 21 of mounting plate 17. The holes 22 in the mounting plate are aligned with the hub cap bolt holes 10 of the hub, and bolts 45 are used to pass through the mounting plate holes 22 with clearance and threadedly engage in the hub holes 10, removably mounting the tool in the hub as shown in FIG. 5 with the tool shaft extending axially therethrough. The original hub cap bolts 11 may be used for this purpose if desired.

Once the mounting plate 17 and the shaft 13 of tool 12 are securely mounted to the hub, the worker takes the locator and pusher 25 and mounts the inner oil seal 46 about the wall 36 with which the seal has a sliding fit, and against the annular surface 32. The worker next mounts the inner bearing 47 on the cylindrical element 38 and against the annular shoulder 37. The locator and pusher 25 is mounted on the tool shaft 13 from the second end 15 thereof, the shaft passing with a sliding fit through the axial bore 29 of the locator and pusher 25.

The thrust washer 40 is thereafter located on the tool shaft 13 and abutted against the thrust bearing 31 of the locator and pusher 25. Finally, the nut 42 of nut assembly 41 is threadedly engaged on the threads 16 at the second end 15 of tool shaft 13. The socket 44 is engaged by a torque wrench and the nut assembly 41 is tightened to a specified torque value assuring that the inner bearing 497 and the inner seal 467 are properly seated within hub 5, as shown in FIG. 6.

Thereafter the nut assembly 41 is loosened and removed from the threads 16 of tool shaft 13, as is the thrust washer 40. The locator and pusher 25 is removed from tool shaft 13 and the inner bearing 42 and the inner oil seal 41 remain in place in the hub. The bolts 40 are removed, enabling the tool shaft 13 and mounting plate 17 to be released from the hub. At this point, the seal replacement operation, per se, is completed.

The only remaining task is to remount the dual tire and wheel assembly back on the axle from which it came. To this end, the outer bearing is located within the hub and the hub is mounted on the axle with the assistance of a lifting dolly. The hub is precluded from coming off the axle by means of the single large nut or the pair of axle nuts and the lock washer therebetween.

It will be evident from the above description that the inner seal replacement operation does not require that the dual tire and wheel assembly be laid over on the side of the outer tire. By the same token, there is no need to lift and return the dual tire and wheel assembly to its normal, upright, vertical position prior to remounting on the axle. Furthermore, the interaction between the tool locator and pusher and the inner end of the hub assures that the seal is properly installed and uniformly pressed into the hub inner end all the way about its circumference. The tool and method of the present invention offer the same advantages when changing the inner oil seal of a single tire and wheel assembly.

Modifications can be made in the invention without departing from the spirit of it. It will be apparent to one skilled in the art that some slightly different arrangements of hub and axle assemblies might require some physical modifications of the tool 12 such as size, length, or the provision of an adapter. The principle is nevertheless the same and these modifications would be well within the skill of the ordinary worker in the art. As an example, if the hub cap threadedly engages the end of the hub, rather than being affixed thereto by bolts, the hub will not have the threaded bores shown at 10 in FIG. 4. In such an instance, an adapter plate may be provided which is designed to be threaded into the hub using the hub threads which the hub cap threadedly engages. The adapter would be provided with threaded bores to receive the bolts 45 and in this way, the shaft 133 and the mounting plate 17 can be attached to the outer end 5a of hub 5. Alternatively, the mounting plate, itself, might be provided with a threaded portion to cooperate with the hub threads.

What is claimed:

1. A tool for use in installing an inner oil seal in the hub of a wheel assembly while the wheel assembly is in a normal upright position, said tool comprising an elongated shaft having first and second ends, said shaft being threaded at said second end, a tool mounting plate having a central bore to receive said tool shaft and being affixed to said shaft inwardly of said first shaft end, said mounting plate being removably attachable to the outer hub end with said tool shaft extending axially through the hub and beyond the inner end thereof, a seal locator and pusher having a central bore and being slidably mountable on said tool shaft from said second end thereof, said locator and pusher having an outer face on which an inner oil seal can be releasably mounted, and a nut tightenable on said shaft threads to abut and shift said locator and pusher along said shaft to seat said inner oil seal in said hub.

2. The tool claimed in claim 1 wherein said tool mounting plate is provided with perforations near and evenly spaced about its periphery whereby bolts can pass through said perforations and threadedly engage in threaded bores in the outer end of a hub.

3. The tool claimed in claim 1 wherein said tool mounting plate is fixed by welding to said tool shaft.

4. The tool claimed in claim 1 wherein said locator and pusher has an outer face facing said tool mounting plate when mounted on said tool shaft, said outer face having an annular surface perpendicular to said tool shaft and an adjacent cylindrical wall surface substantially parallel to said shaft for slidably receiving and supporting said inner oil seal.

5. The tool claimed in claim 4 wherein said outer face of said locator and pusher has a central cylindrical portion separated from said cylindrical wall surface by an annular shoulder whereby the inner bearing of a hub can be mounted about said cylindrical portion against said annular shoulder for installation by the tool of the inner bearing and the inner oil seal simultaneously.

6. The tool claimed in claim 5 including an inner face on said locator and pusher, a thrust bearing mounted on said inner face of said locator and pusher and surrounding said central bore thereof, and a thrust washer cooperating with said thrust bearing.

7. The tool claimed in claim 1 including a piece of tubular pipe having first and second ends, said first pipe end being coaxially welded to said nut, said pipe being sized to accommodate a portion of said threaded end of said tool shaft, a socket being coaxially welded to said second end of said pipe.

8. The tool claimed in claim 1 wherein said wheel is a single tire, single wheel assembly.

9. The tool claimed in claim 1 wherein said wheel assembly is a dual tire and wheel assembly.

10. A method of installing an inner oil seal in the hub of a wheel assembly while said wheel assembly is in a normal upright position, said method comprising the steps of locating said dual tire and wheel assembly on a supporting surface in a normal upright position, removing from said hub the inner oil seal to be replaced, providing an inner oil seal replacing tool comprising an elongated shaft having outer and inner ends, said shaft being threaded at said inner end, a mounting plate having a central bore to receive said shaft and being affixed to said shaft inwardly of said shaft outer end, a locator and pusher having a central bore and being slidably mountable on said tool shaft from said inner end thereof, and a nut threadedly engageable on said threaded inner end of said tool shaft, attaching said mounting plate to the outer end of said hub with said tool shaft extending axially through said hub, slidably mounting a new inner oil seal on said locator and pusher, mounting said locator and pusher on said shaft from said inner end thereof, engaging said nut on said shaft threads and tightening said nut to a specified torque value and shifting therewith said locator and pusher to seat said inner oil seal in said hub, removing said nut and locator and pusher from said shaft and disengaging said tool mounting plate from said hub outer end.

11. The method claimed in claim 10 wherein said hub is of the type having a plurality of longitudinal threaded bores for hub cap mounting bolts, evenly spaced about said outer end of said hub, providing said tool mounting plate with a set of matching clearance holes, aligning said clearance holes with said hub bores and inserting bolts through said clearance holes and tightening said bolts in said threaded longitudinal bores of said hub.

12. The method claimed in claim 10 including the steps of providing said locator and pusher with an outer face having an annular surface perpendicular to said tool shaft and an adjacent cylindrical wall surface parallel to said shaft to receive and support an inner oil seal with a sliding fit.

13. The method claimed in claim 10 including the steps of providing the inner face of said locator and pusher with a thrust bearing about said central bore and providing a thrust washer adjacent said thrust bearing.

14. The method claimed in claim 12 including the steps of providing said outer face of said locator and pusher with a central cylindrical portion separated from said cylindrical wall surface by an annular shoulder, sizing said central cylindrical portion to mount the inner bearing of said hub with a sliding fit and in abutment with said shoulder, mounting said inner oil seal and said inner bearing on said locator and pusher and mounting said inner bearing and said inner seal simultaneously in said hub.

15. The method claimed in claim 10 including the steps of welding the first end of a section of tubular pipe axially to said nut and welding a socket coaxially on the second end of said section of tubular pipe, sizing said section of tubular pipe to accommodate a portion of said threaded inner end of said tool shaft.

16. The method claimed in claim 10 wherein said wheel is a single tire, single wheel assembly.

17. The method claimed in claim 10 wherein said wheel assembly is a dual tire and wheel assembly.

* * * * *